(12) United States Patent
Mitra et al.

(10) Patent No.: US 9,468,010 B2
(45) Date of Patent: Oct. 11, 2016

(54) APPARATUS AND METHODS FOR FACILITATING TUNE-AWAY OPERATIONS IN WIRELESS COMMUNICATIONS SYSTEMS

(71) Applicant: QUALCOMM Incorporated, San Diego, CA (US)

(72) Inventors: Soumen Mitra, Hyderabad (IN); Robert King Chan, La Jolla, CA (US); Ammar Taiyebi Kitabi, San Diego, CA (US); Aritra Ukil, Hyderabad (IN); Vijay Karthic Elangovan, Hyderabad (IN); Simei Du, San Diego, CA (US); Jayesh Bathija, San Diego, CA (US); Kamalakar Ganti, San Diego, CA (US); Vamsi Krishna Chaitanya Komati, Hyderabad (IN); Janga Reddy Alimineti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/218,375

(22) Filed: Mar. 18, 2014

(65) Prior Publication Data
US 2015/0181614 A1 Jun. 25, 2015

Related U.S. Application Data

(60) Provisional application No. 61/919,438, filed on Dec. 20, 2013.

(51) Int. Cl.
| | | |
|---|---|---|
| H04W 72/08 | (2009.01) |
| H04W 56/00 | (2009.01) |
| H04W 76/04 | (2009.01) |
| H04W 72/12 | (2009.01) |
| H04W 68/02 | (2009.01) |
| H04W 48/18 | (2009.01) |
| H04W 68/00 | (2009.01) |
| H04W 88/06 | (2009.01) |
| H04W 8/18 | (2009.01) |

(Continued)

(52) U.S. Cl.
CPC ......... *H04W 72/085* (2013.01); *H04W 56/004* (2013.01); *H04W 76/04* (2013.01); *H04W 8/183* (2013.01); *H04W 48/18* (2013.01); *H04W 68/00* (2013.01); *H04W 68/02* (2013.01); *H04W 72/1278* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,664,069 B2 * | 2/2010 | Bae | H04B 7/2628 370/329 |
| 8,125,967 B1 | 2/2012 | Talley et al. | |

(Continued)

FOREIGN PATENT DOCUMENTS

WO    WO-2011109750 A1    9/2011

OTHER PUBLICATIONS

International Search Report and Written Opinion—PCT/US2014/071398—ISA/EPO —Mar. 31, 2015.

*Primary Examiner* — Vinncelas Louis
(74) *Attorney, Agent, or Firm* — Loza & Loza LLP

(57) ABSTRACT

Access terminals are adapted to facilitate tune-away operations in situations in which multiple subscriptions are employed. According to one example, an access terminal performing an acquisition procedure for a first subscription may suspend the acquisition procedure to obtain a paging message for a second subscription. The access terminal can tune away from the first subscription to the second subscription and monitor for a mobile-terminated page. After a mobile-terminated page associated with the second subscription is received and processed, the access terminal may resume the acquisition procedure for the first subscription. Other aspects, embodiments, and features are also included.

20 Claims, 8 Drawing Sheets

(56) References Cited

U.S. PATENT DOCUMENTS

| | | |
|---|---|---|
| 8,369,849 B2 | 2/2013 | Furumi |
| 8,570,951 B1 * | 10/2013 | Rajurkar .............. H04W 76/04 370/328 |
| 2007/0294494 A1 | 12/2007 | Conti et al. |
| 2008/0014938 A1 | 1/2008 | Hart et al. |
| 2011/0195749 A1 * | 8/2011 | Lan ....................... H04W 8/183 455/558 |
| 2012/0027003 A1 * | 2/2012 | Chin ................. H04W 52/0216 370/342 |
| 2013/0303240 A1 * | 11/2013 | Sanka ................. H04B 1/3816 455/558 |

* cited by examiner

APPARATUS AND METHODS FOR FACILITATING TUNE-AWAY OPERATIONS IN WIRELESS COMMUNICATIONS SYSTEMS

PRIORITY CLAIM

The present application for patent claims priority to Provisional Application No. 61/919,438 entitled "Apparatus and Method For Enabling Tune-Away Operations Within 1xEV-DO Acquisition and Synchronization States" filed Dec. 20, 2013, and assigned to the assignee hereof and hereby expressly incorporated by reference herein for all applicable purposes.

TECHNICAL FIELD

The technology discussed below relates generally to wireless communications, and more specifically to tune-away operations in an access terminal operable in a wireless communication network. Implementing aspects of the technology can enable wireless devices to avoid missing voice calls, among other advantages.

BACKGROUND

Wireless communication systems are widely deployed to provide various communication services such as telephony, video, data, messaging, broadcasts, and so on. Wireless communications networks, which are usually multiple access networks, support communications for multiple users by sharing the available network resources. Examples of such networks include networks based on the Global System for Mobile Communications (GSM), the Universal Mobile Telecommunications System (UMTS), and Long Term Evolution (LTE), which are defined by the 3rd Generation Partnership Project (3GPP), as well as cdma2000 1x and 1xEV-DO, which are defined by the 3rd Generation Partnership Project 2 (3GPP2), among others.

Wireless communication systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems. Multiple types of devices are adapted to utilize such wireless communications systems. Such devices may be generally referred to as access terminals.

As the demand for mobile broadband access continues to increase, research and development continue to advance the technology not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In various aspects, the disclosure provides a method, an apparatus, a system, and a computer program capable of improving mobile-terminated (MT) page performance for access terminals (e.g., multi-mode access terminals) for high-priority voice technologies. According to at least one aspect of the disclosure, access terminals may include a communications interface and a plurality of subscription modules, including a first subscription module associated with a first subscription and a second subscription module associated with a second subscription. The communications interface and the plurality of subscription modules may be coupled with a processing circuit. The processing circuit may be adapted to perform an acquisition process for the first subscription via the communications interface. The processing circuit may further be adapted to suspend the acquisition process for the first subscription and tune the communications interface to the second subscription for a mobile-terminated page on the second subscription. The processing circuit may also be adapted to monitor the second subscription for a mobile-terminated page via the communications interface.

Further aspects provide methods operational on access terminals and/or access terminals including means to perform such methods. One or more examples of such methods may include performing an acquisition process for a first subscription. The acquisition process for the first subscription may be suspended, and the access terminal may be tuned to a second subscription to enable receipt of a mobile-terminated page associated with the second subscription. The access terminal may further monitor for a mobile-terminated page associated with the second subscription.

Still further aspects include processor-readable storage mediums comprising programming executable by a processing circuit. According to one or more examples, such programming may be adapted for causing the processing circuit to perform an acquisition process for a first subscription. The programming may further be adapted for causing the processing circuit to suspend the acquisition process for the first subscription, release communication interface resources to a second subscription to enable receipt of a mobile-terminated page associated with the second subscription, and monitor for a mobile-terminated page associated with the second subscription.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below with reference to one or more specific wireless communications protocols and systems, but those of ordinary skill in the art will recognize that one or more aspects of the present disclosure may be employed and included in one or more other wireless communication protocols and systems.

Figure 1:
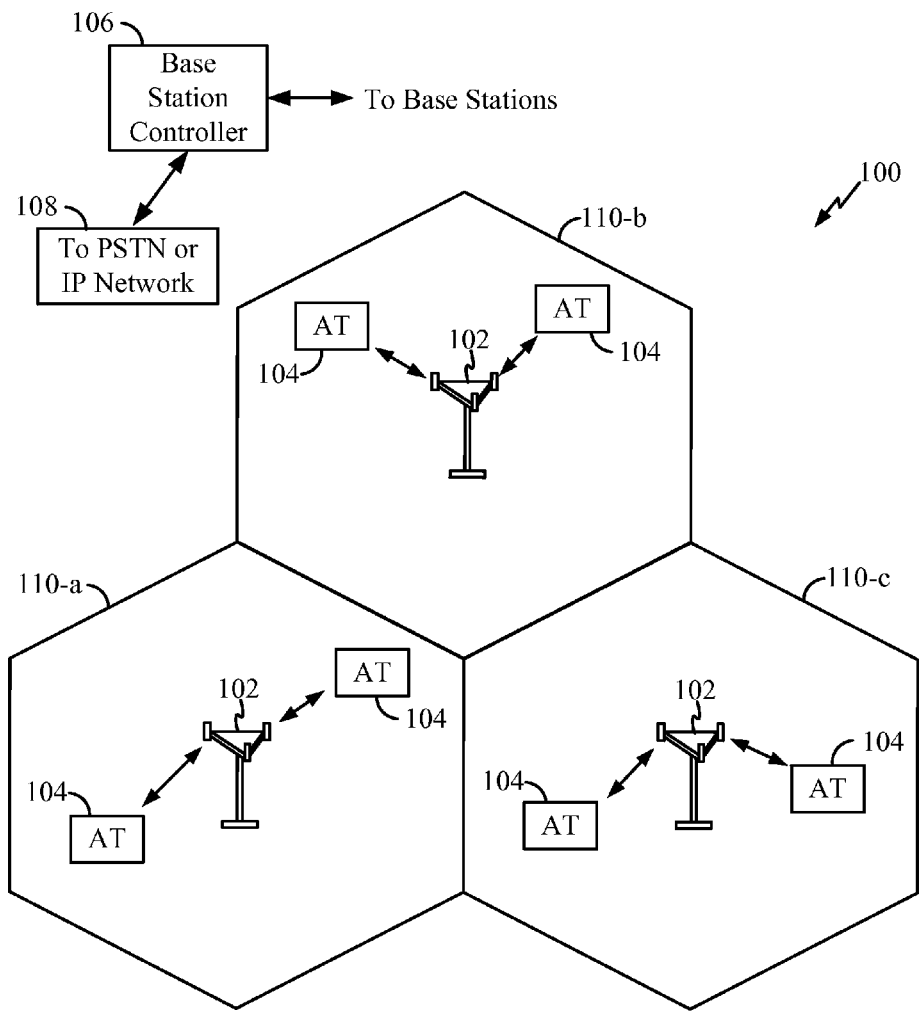
FIG. 1 is a block diagram illustrating an example of a network environment in which one or more aspects of the present disclosure may find application.

Referring now to FIG. 1, a block diagram is shown illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, toy, automotive/vehicle modules, sensor, sensing device, wearable device, router, and/or other communication/computing device which communicates, at least partially, through a wireless or cellular network.

Figure 2:
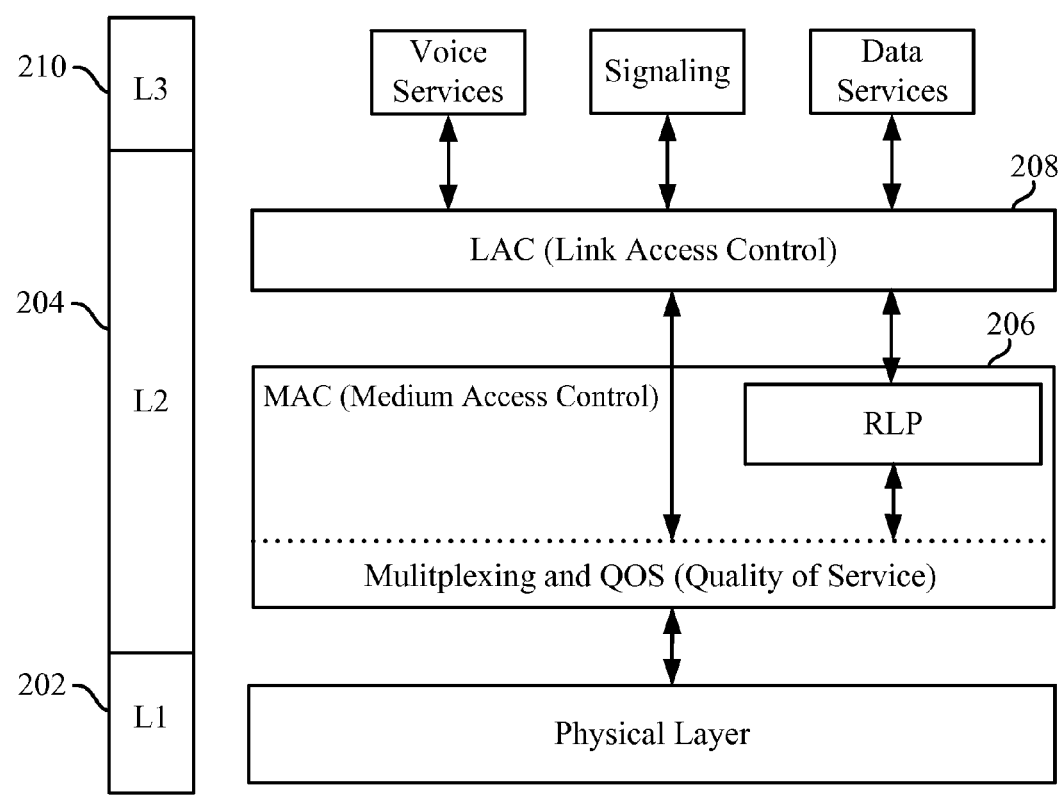
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

In some examples, an access terminal may be capable of communicating on two or more different radio access technologies. One example of a multi-subscription implementation on an access terminal may employ one radio access technology (RAT) for voice communication and another radio access technology (RAT) for data. Such access terminals are often referred to as hybrid devices or hybrid access terminals. One common hybrid access terminal is a single-SIM device that may be referred to as a 1x/DO hybrid access terminal, which is capable of communicating on both 1xEV-DO networks and on cdma2000 1x networks. Another example of a hybrid access terminal is a dual- or multi-SIM device, which may be capable of communicating on any two or more different networks corresponding to two or more respective user subscriptions.

Figure 3:
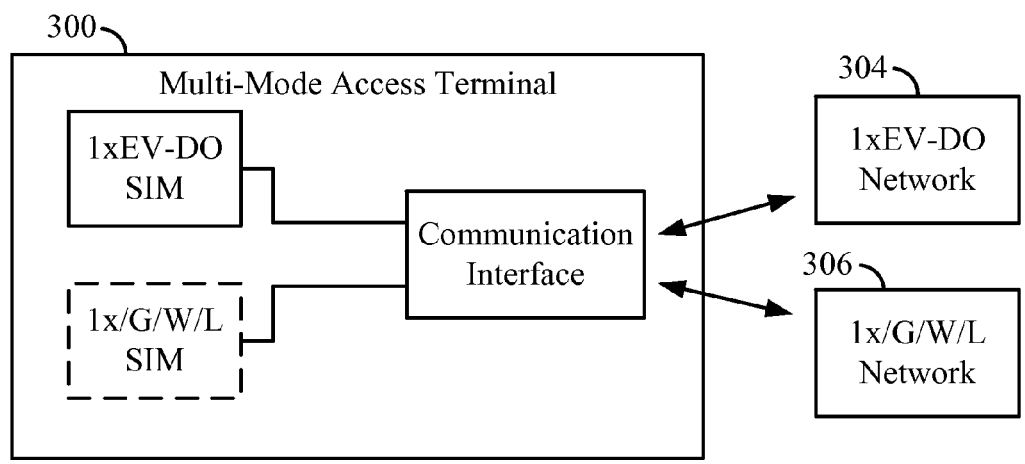
FIG. 3 is a simplified block diagram illustrating an access terminal configured to utilize two different networks according to some embodiments.

For instance, FIG. 3 is a simplified block diagram illustrating an access terminal 300 according to one embodiment. As illustrated in this example, the access terminal 300 may be a multi-mode access terminal configured for either single-SIM operations, or dual- or multi-SIM operations. A first SIM corresponding to a first subscription (e.g., on a 1xEV-DO network 304) may be employed by the access terminal 300 for data, while an optional second SIM corresponding to a second subscription (e.g., on a 1x, GSM, W-CDMA, and/or LTE network 306) may be employed for voice communication. The first SIM and the second (optional) SIM are coupled to a single communication interface, such that both subscriptions share an RF resource corresponding to the communication interface. As a result, the time of operation of the communication interface is typically split between the different subscriptions/operations. Similarly, in a single-SIM example, different modes of operation (e.g., a cdma2000 1x mode and a 1xEV-DO mode) may both be operable using a single subscription, and sharing the RF resources.

In some instances, the first (or data) subscription may attempt to acquire service on its respective network. During the acquisition procedure, any pages that arrive for second (or voice) subscription can fail, since the shared RF resources are being employed by the first subscription. By way of example and not limitation, the access terminal 300 may experience a wide range of rapidly changing channel conditions, e.g., including but not limited to signal reflections, interference, noise, etc. In certain channel conditions, the access terminal 300 may lose service very frequently. For instance, when attempting to maintain a connection on the first subscription (e.g., with a 1xEV-DO network 304), the access terminal 300 may move to an out-of-service (OOS) condition over and over again due to the poor channel conditions. Over time, the access terminal 300 may repeatedly, and often, lose its connection with the network associated with the first subscription (e.g., the 1xEV-DO network 304). Once the connection is lost, the access terminal 300 may attempt to acquire the system once again, and hence, may move through INACTIVE, ACQ, SYNC, and IDLE states, as described below. During this time, the access terminal 300 would conventionally tie up the RF resources from use for the second subscription (e.g., the 1x/G/W/L network 306), which can result in missed pages for the second subscription.

Figure 4:
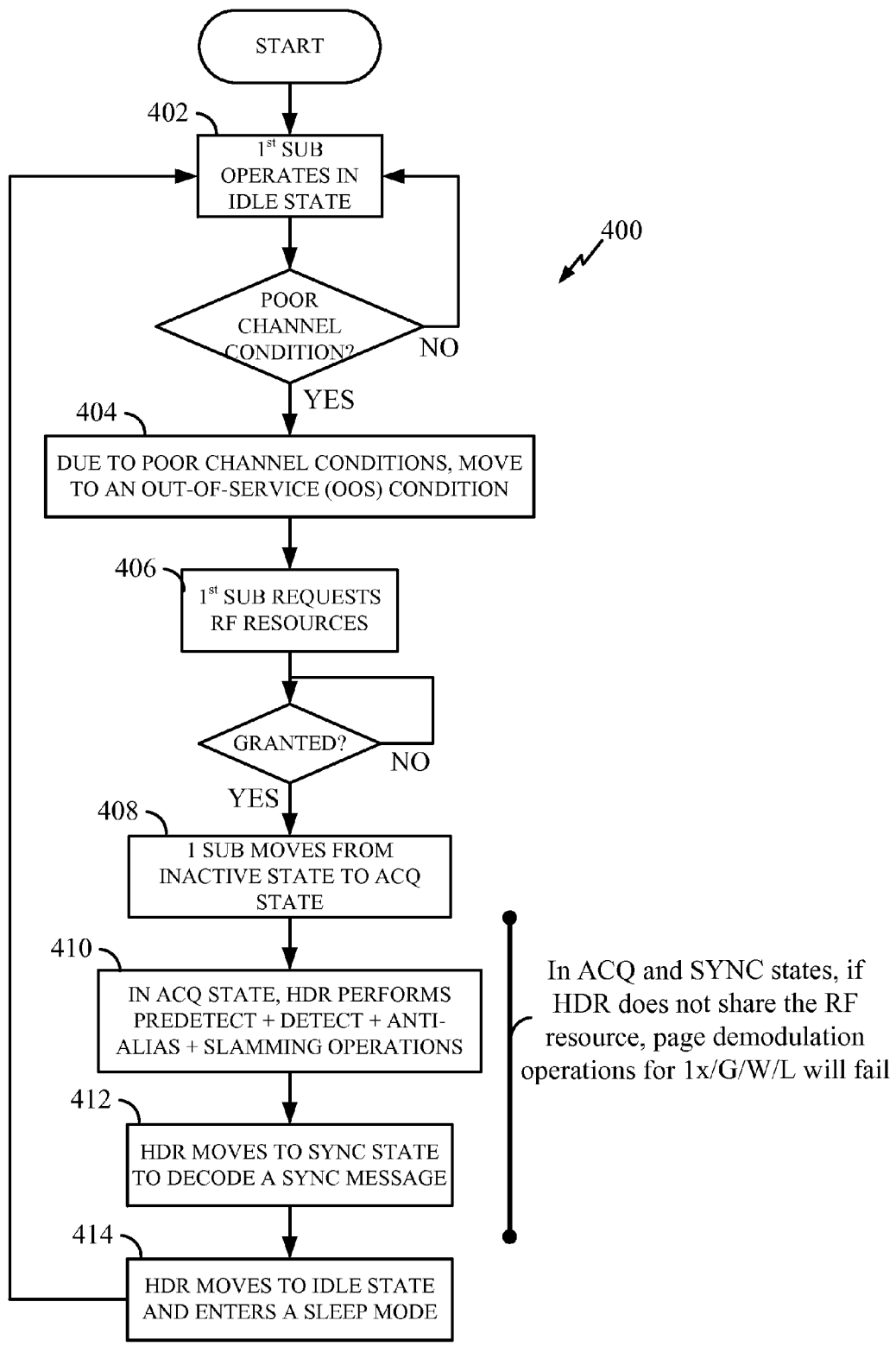
FIG. 4 is a flow chart illustrating a method of wireless communication between a mobile device and a telecommunications network according to some embodiments.

FIG. 4 is a flow diagram illustrating an example of a process 400 that may be implemented by an access terminal, such as the access terminal 300, in instances of the above described example where channel conditions cause the access terminal to perform acquisition procedures. Initially, at block 402, the access terminal 300 may operate in an IDLE state on the first subscription. In some instances, the IDLE state may be a slotted IDLE mode (e.g., discontinuous reception or DRX) or a non-slotted mode. In such a slotted IDLE mode, the access terminal 300 may perform operations such as listening for, receiving, and/or responding to incoming mobile-terminated (MT) page messages from the network 304 associated with the first subscription.

During operation in the IDLE state, as described above, due to any of various circumstances such as the mobility of the user, highly faded conditions and/or low geometry channel conditions may result in measurements of the channel made by the access terminal 300 indicating that channel conditions are poor. At block 404, therefore, due to the poor channel conditions, the access terminal 300 may move to an out-of-service (OOS) condition, including a transition from the IDLE state to an INACTIVE state.

In the OOS condition, it may arise that the access terminal 300 determines that it is desirable to re-acquire the connection with the network associated with the first subscription (e.g., the 1xEV-DO network 304). In this case, at block 406, the first subscription may request for use of the access terminal's RF resources, such as the communication interface. If the RF resource is granted to the first subscription, then at block 408, upon receiving the RF resource, the access terminal may move from the INACTIVE state on the first subscription to an ACQ state for re-acquiring the connection with the network associated with the first subscription (e.g., the 1xEV-DO network 304).

At block 410, in the ACQ state, the access terminal 300 may perform conventional ACQ operations on the first subscription. The ACQ operation may be implementation-specific, or in other examples, may be defined in the specific standards associated with the first subscription (e.g., the 3GPP2 standards for 1xEV-DO operations). Such standardized operations are generally known to those of ordinary skill in the art, and accordingly not described herein in great detail.

At block 412, following a successful ACQ process, the access terminal 300 may move to the SYNC state on the first subscription, where it will decode a sync message transmitted from the network associated with the first subscription (e.g., 1xEV-DO network 304). The access terminal 300 typically has a predefined time period to perform the SYNC operations. Conventionally, this is defined by a SYNC TIMEOUT Timer, that is typically 5 seconds in duration. After a successful SYNC operation, the access terminal 300 may move to the IDLE state on the first subscription, and may accordingly enter a slotted/non-slotted sleep mode based on the configuration of the access terminal 300.

During the acquisition procedure (e.g., during the ACQ and/or SYNC states corresponding to blocks 408-414), once the first subscription is granted the RF resource, the first subscription will not release the RF resource until the acquisition procedure (e.g., the ACQ and/or SYNC operations) is completed. Therefore, if mobile-terminated pages corresponding to the second subscription at the access terminal 300, such as pages corresponding to cdma2000 1x, to GSM, to W-CDMA, to LTE, or to any other system or protocol (abbreviated herein as 1x/G/W/L for convenience) arrive at the access terminal 300 around this time, the page demodulation operation by 1x/G/W/L, which may correspond to a higher priority operation than the first subscription operation (e.g., the ACQ or SYNC operation), will fail, due to the unavailability of the RF resources. In this situation, a page erasure would be declared for the mobile-terminated page, and the 1x/G/W/L mobile-terminated call may fail.

Moreover, in certain situations the above-described process may cycle repeatedly, such as highly faded conditions and/or low geometry channel conditions where poor channel conditions cause the access terminal 300 to repeatedly move to the OOS condition and then perform a new acquisition procedure, resulting in relatively large amounts of time in performing acquisition procedures (e.g., in the ACQ and SYNC states corresponding to blocks 508-514). Such a scenario can problematically result in many page demodulation operations for the second subscription failing, adversely affecting mobile-terminated call performance and degrading the user experience. Of course, aspects of the present disclosure are not limited to the case of highly faded conditions and/or low geometry channel conditions, but rather may be implemented in any suitable scenario, which in some cases may be independent of channel conditions. For example, as described below in further detail, implementation of one or more aspects of the disclosure may be based on a priority of operation of the other RAT requesting the RF resource.

Figure 5:
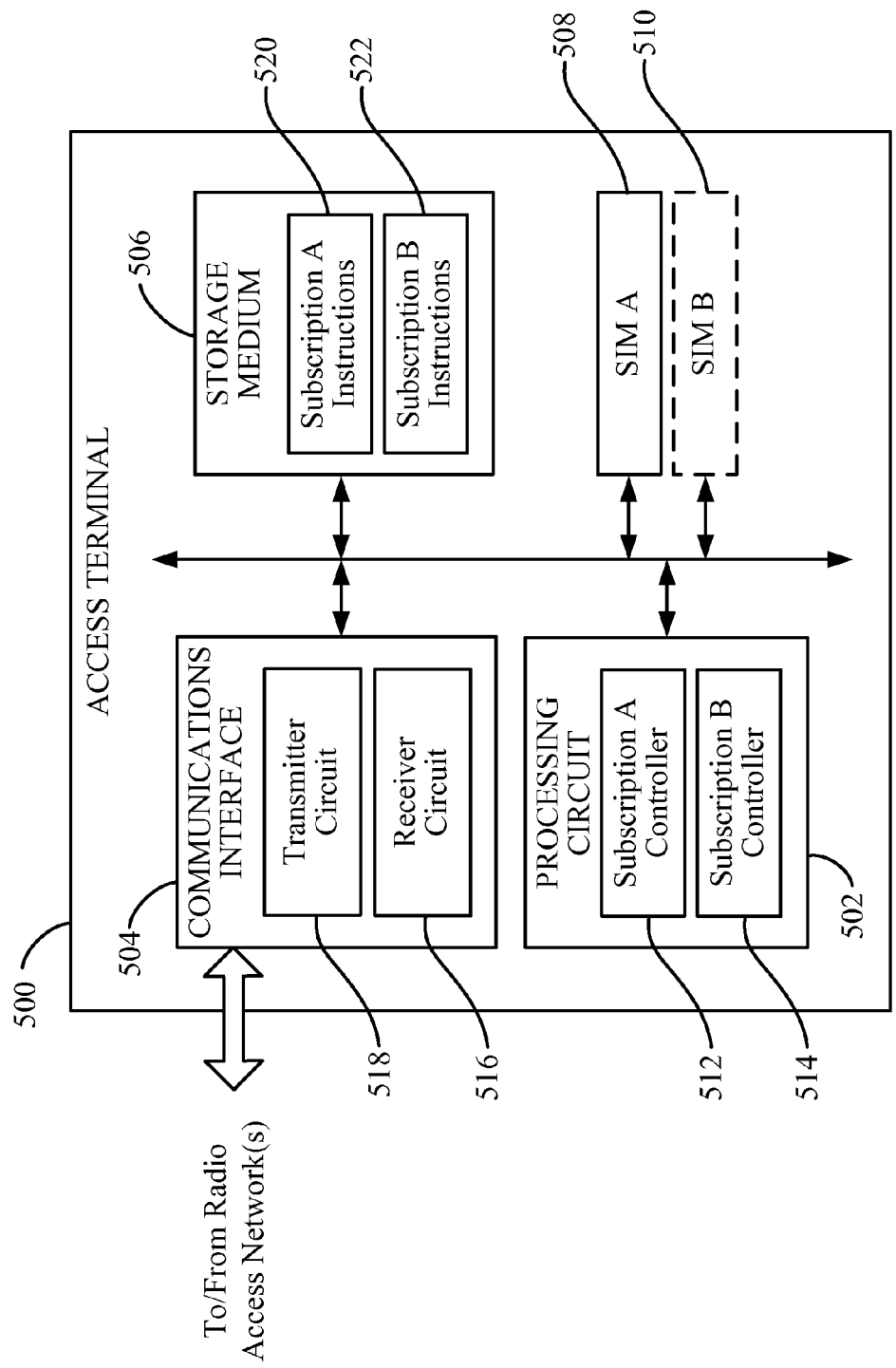
FIG. 5 is a block diagram illustrating select components of an access terminal according to some embodiments.

According to at least one aspect of the disclosure, access terminals are adapted to release RF resources occupied by a first subscription to another subscription (e.g., another radio access technology (RAT/SIM)) when there is a higher priority reservation of those RF resources by the other subscription. Turning to FIG. 5, a block diagram is shown illustrating additional detail of the access terminal 500 according to at least one example of the present disclosure. The access terminal 500 includes a processing circuit 502 coupled to or placed in electrical communication with a communications interface 504 and a storage medium 506.

According to an aspect of the present disclosure, the access terminal 500 is adapted to employ multiple subscriptions. Accordingly, the access terminal 500 may include one or more subscription modules represented generally by SIM-A 508 and optional SIM-B 510. The subscription modules 508, 510 may also be referred to interchangeably herein as a subscriber identity module (SIM). However, the one or more subscription modules may be one or more suitable subscription modules including, but not limited to, a Subscriber Identity Module (SIM), Removable User Identity Module (R-UIM), Universal Integrated Circuit Card (UICC), CDMA Subscriber Identity Module (CSIM), Universal Subscriber Identity Module (USIM)), etc. SIM-A 508 and SIM-B 510 may be associated with a different service subscription, different network access over the same or different network type, and/or use the same or different radio access technologies. In at least one example, the SIM-A 508 may be configured for a first (or data) subscription, such as on a 1xEV-DO network, and (optionally) the SIM-B 510 may be configured for a second (or voice) subscription on another network, such as a 1x, GSM, W-CDMA, and/or LTE network (1x/G/W/L).

The processing circuit 502 is arranged to obtain, process and/or send data, control data access and storage, issue commands, and control other desired operations. The processing circuit 502 may include circuitry adapted to implement desired programming provided by appropriate media, and/or circuitry adapted to perform one or more functions described in this disclosure. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 502 may include subscription A controller circuitry 512, configured to utilize the communication interface 504 for wireless communication with a first subscription (e.g., a 1xEV-DO network). The processing circuit 502 may further include subscription B controller circuitry 514 configured to utilize the communication interface 504 for wireless communication with a second network (e.g., a 1X/G/W/L network).

The communications interface 504 is configured to facilitate wireless communications of the access terminal 500. For example, the communications interface 504 may include circuitry and/or programming adapted to facilitate the communication of information bi-directionally with respect to one or more wireless network devices. The communications interface 504 may be coupled to one or more antennas (not shown), and includes wireless transceiver circuitry, including at least one receiver circuit 516 (e.g., one or more receiver chains) and/or at least one transmitter circuit 518 (e.g., one or more transmitter chains).

The storage medium 506 may represent one or more processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming By way of example and not limitation, the storage medium 506 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. In at least some examples, the storage medium 506 may include subscription A instructions 520, and subscription B instructions 522, each configured for regulating operations at one or more hardware blocks of the processing circuit 502, as well as to utilize the communication interface 504 for wireless communication utilizing their respective communication protocols. For example, the subscription A instructions block 516 may be configured for active and idle mode operations corresponding to a first subscription (e.g., a 1xEV-DO network), such as a subscription corresponding to the SIM A 508. Similarly, the subscription B instructions block 522 may be configured for active and idle mode operations corresponding to a second subscription (e.g., a 1x/GSM/W-CDMA/LTE network), such as a subscription corresponding to the SIM B 510.

Thus, according to one or more aspects of the present disclosure, the processing circuit 502 is adapted to perform (in conjunction with the storage medium 506) any or all of the processes, functions, steps and/or routines for any or all of the access terminals described herein (e.g., access terminal 104, access terminal 300, access terminal 500). As used herein, the term "adapted" in relation to the processing circuit 502 may refer to the processing circuit 502 being one or more of configured, employed, implemented, and/or programmed (in conjunction with the storage medium 506) to perform a particular process, function, step and/or routine according to various features described herein.

As noted above, the access terminal 500 may encounter instances in which a first subscription (e.g., the subscription associated with SIM A 508) utilizes the resources of the communications interface 504 in a manner that would typically result in the second subscription (e.g., the subscription associated with SIM B 510) missing pages. One example of such a scenario is when the access terminal 500 is operating in conditions resulting in frequent loss of service, resulting in repeated acquisition procedures locking up the resources of the communications interface 504. The access terminal 500, however, is adapted to suspend procedures on the first subscription to enable the second subscription to monitor for periodic mobile-terminated page messages.

Figure 6:
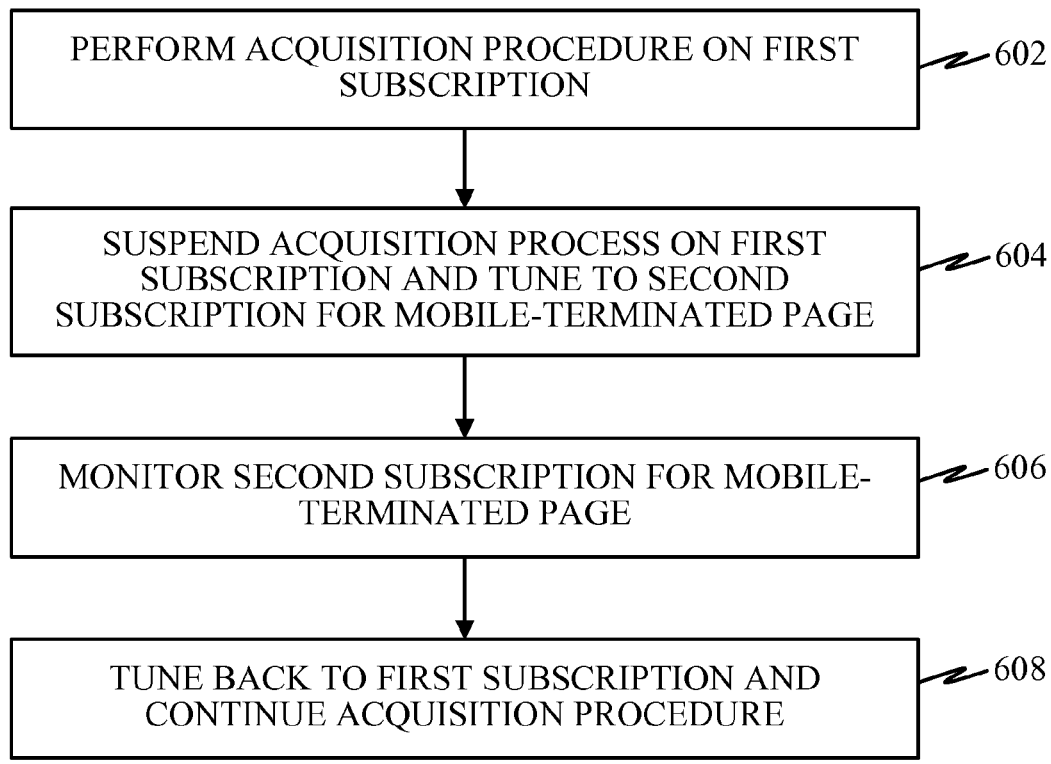
FIG. 6 is a flow diagram illustrating a method operational on an access terminal according to some embodiments.

FIG. 6 is a flow diagram illustrating at least one example of a method operational on an access terminal, such as the access terminal 500. Referring to FIGS. 5 and 6, an access terminal 500 may enable a first subscription to employ the RF resources for wireless communications. For instance, the access terminal 500 may perform an acquisition procedure on a first subscription at 602. In one example, the processing circuit 502 (e.g., the subscription A controller 512) executing the subscription A instructions 520 may employ the communications interface 504 to perform an acquisition procedure on the first subscription associated with SIM A 508.

The access terminal 500 may suspend the activities of the first subscription that employ the RF resources of the communications interface to tune to a second subscription for the purpose of obtaining a mobile-terminated page associated with the second subscription. For example, at 604 the access terminal 500 may suspend an acquisition procedure on the first subscription to tune the communications interface 504 to enable the second subscription to obtain a mobile-terminated page. In at least one implementation, the processing circuit 502 (e.g., the subscription A controller 512) executing the subscription A instructions 520 may suspend the acquisition procedure on the first subscription and may release the resources of the communications interface 504 to the second subscription. The processing circuit 502 (e.g., the subscription B controller 514) executing the subscription B instructions 522 can then tune the communications interface 504 to enable the receiver circuit 516 to receive and process an incoming page message.

In at least one implementation, the access terminal 500 can suspend the acquisition procedure on the first subscription and tune to the second subscription according to a paging schedule associated with the second subscription. That is, when the second subscription is operating in a slotted IDLE mode, the second subscription is expected to be listening to a paging channel at predefined intervals to listen for pages that may be directed to the access terminal 500. In some examples of a slotted IDLE mode, a page slot can be scheduled every 5 seconds. The processing circuit 502 can accordingly suspend the first subscription, and tune the communications interface 504 to the second subscription for monitoring for page messages in time for the next paging cycle according to the predefined interval.

At step 606, the access terminal 500 can monitor for a mobile-terminated page message on the second subscription. For example, the processing circuit 502 (e.g., the subscription B controller 514) executing the subscription B instructions 522 can monitor the second subscription via the communications interface 504 for a mobile-terminated page message associated with the second subscription.

On completion of page handling operations on the second subscription, the access terminal 608 can return the RF resources back to the first subscription at 608. For example, the processing circuit 502 can release the resources of the communications interface 504 to the first subscription, enabling the communications interface 504 to be tuned back to the first subscription for continuing the operations that were suspended on the first subscription, such as an acquisition procedure.

Figure 7:
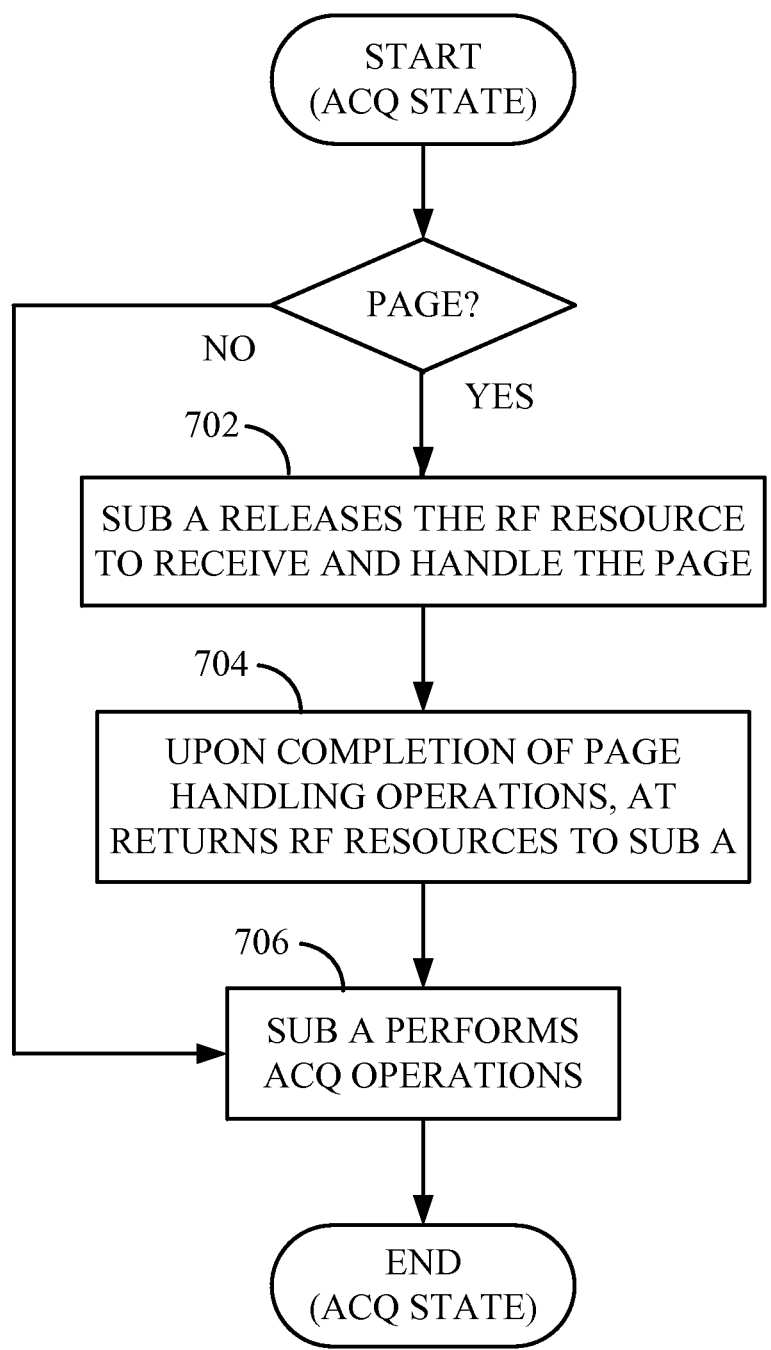
FIG. 7 is a flow diagram illustrating a process of handling paging operations for a second network while a first network operates in an ACQ state.
Figure 8:
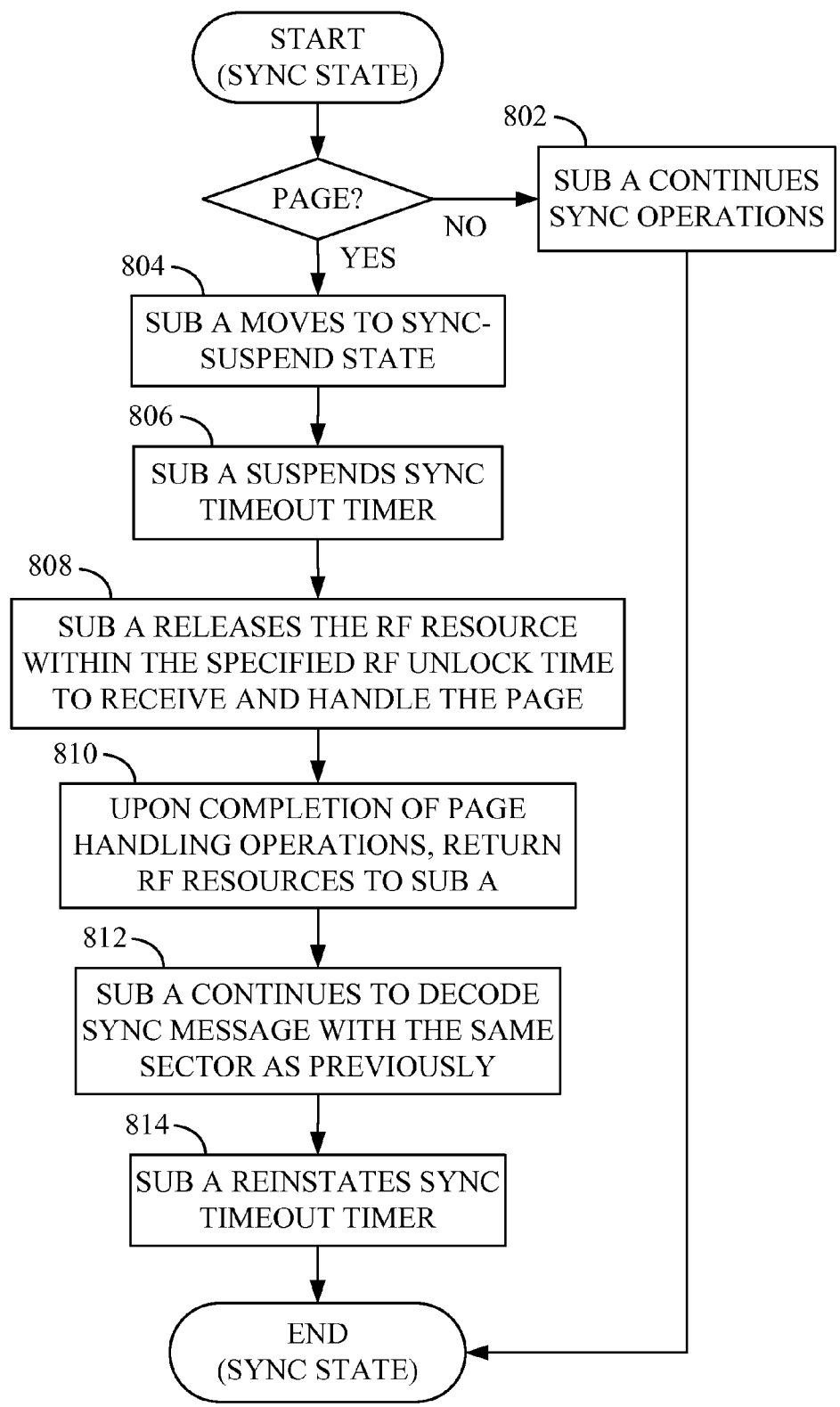
FIG. 8 is a flow diagram illustrating a process of handling paging operations for a second network while first network operations are in a SYNC state, according to some embodiments.

As noted above, some examples include instances where the first subscription is employing the RF resources to perform an acquisition procedure. Also, as noted with reference to FIG. 4 above, an access terminal typically employs various states during such an acquisition procedure, including the ACQ state (see 408-410 in FIG. 4), and the SYNC state (see 412-414 in FIG. 4. FIGS. 7 and 8 are flow diagrams illustrating examples of processes associated with acquisition procedures that may be implemented by an access terminal of the present disclosure, such as the access terminal 500.

In FIG. 7, the access terminal 500 may be operating in the ACQ state of an acquisition procedure. While performing operations in the ACQ state, the access terminal 500 may detect (and/or predict the presence of) an incoming page message corresponding to the second subscription. That is, the access terminal 500 may detect that a periodic page slot is arriving for the second subscription. Here, it may be the case that the second subscription, or the message corresponding to the incoming page, is considered to be of a higher priority than the acquisition operations ongoing in the ACQ state on the first subscription. Thus, at block 702, the subscription A controller 512 may release the RF resources, such that the subscription B controller 514 may utilize the RF resources to receive and handle the incoming page message. Thereafter, upon completion of the second subscription page handling operations, at block 704 the access terminal 500 may return the RF resource (e.g., corresponding to the communication interface 504) to the control of the subscription A controller 512. Here, when the access terminal 500 releases the RF resource from the control of the second subscription, in some aspects of the disclosure, the communication interface 504 may be held in a suitable state, such that, upon resuming the acquisition operation (as described below), the access terminal 500 may be capable of resuming the acquisition operation that was ongoing prior to its release of the RF resource at block 702. In another example, the access terminal 500 may start from an initial state, in accordance with technological convenience or operator preference. Thus, at block 706, the subscription A controller 512 may re-start or resume the ACQ-state operations, e.g., on the same band and channel combination as utilized in the previous acquisition attempt.

The process depicted by the flow diagram in FIG. 8 corresponds generally to a situation in which the subscription A controller 512 of the access terminal 500 is operating in the SYNC state. Here, while performing SYNC-state operations, the access terminal 500 may detect (and/or predict the presence of) an incoming page message corresponding to the second subscription. That is, the access terminal 500 may determine that a predefined time slot for receiving a page message is arriving for the second subscription. If no page message corresponding to the second subscription is expected, then the process may proceed to block 802, wherein the subscription A controller 512 may continue normal SYNC mode operations. However, if the page message corresponding to the second subscription is expected, it may be the case that the second subscription, or the message corresponding to the incoming page, is considered to be of a higher priority than the first subscription operations ongoing in the SYNC state. Thus, at block 804, the subscription A controller 512 may suspend the SYNC operations by moving to a SYNC-SUSPEND state, and at block 806.

When the SYNC-SUSPEND state is employed, the subscription A controller 512 may suspend a SYNC TIMEOUT timer. Typically, the SYNC TIMEOUT timer is employed to terminate SYNC operations after a predefined period of time (e.g., 5 seconds). The paging operations on the second subscription, however, can take longer than the duration of the SYNC TIMEOUT timer, in some instances. In order to avoid the SYNC operations timing out while the second subscription is handling the paging message, the subscription A controller 512 can pause the SYNC TIMEOUT timer during the period of time that the access terminal 500 is tuned to the second subscription. By suspending the SYNC TIMEOUT timer, the subscription A controller 512 can have a sufficient amount of time after the page handling operation to complete a SYNC operation before declaring a SYNC failure.

In some implementations, the subscription A controller 512 may further limit the amount of time that the SYNC TIMEOUT timer can be paused. For example, when the SYNC TIMEOUT timer is paused, a SYNC SUSPEND timer may be initiated for a predefined duration (e.g., 5 seconds). If the SYNC SUSPEND timer expires, the subscription A controller 512 may determine a SYNC failure, resulting in the SYNC operations timing out. That is, if the SYNC SUSPEND timer expires while the access terminal 500 is tuned to the second subscription, the subscription A controller 512 may restart the SYNC operations when the access terminal 500 is tuned back to the first subscription, instead of picking up where it left off in the SYNC operations.

At block 808, the subscription A controller 512 may release the RF resource within a specified RF unlock time, to provide for the second subscription page handling operation. Upon completion of the second subscription page handling operation, at block 810 the access terminal 500 may return the RF resource to the subscription A controller 512 to continue with the SYNC operations. If the SYNC SUSPEND timer did not expire during the time when the access terminal 500 was tuned to the second subscription, the subscription A controller 512 may continue with the same sector with which it was previously connected to decode a SYNC message at block 812. Furthermore, at block 814, the subscription A controller 512 may reinstate the SYNC TIMEOUT timer.

On the other hand, if the SYNC SUSPEND timer did expire during the time when the access terminal 500 was tuned to the second subscription, the subscription A controller 512 can restart the SYNC operations at block 812, including initiating a new SYNC TIMEOUT timer at block 814.

By utilizing one or more aspects of the present disclosure, an increase in the success rate of mobile-terminated page decodes can be achieved, for radio access networks associated with a second subscription. Further, one or more aspects of the disclosure can ensure a decrease in the occurrence of System Lost during the Sync operation (e.g., HDR Sync Failure).

While the above discussed aspects, arrangements, and embodiments are discussed with specific details and particularity, one or more of the components, steps, features and/or functions illustrated in FIGS. 1, 2, 3, 4, 5, 6, 7, and/or 8 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 3, and/or 5 may be configured to perform or employ one or more of the methods, features, parameters, and/or steps described in FIGS. 2, 4, 6, 7, and/or 8. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
   a communications interface;
   a plurality of subscription modules, including a first subscription module associated with a first subscription, and a second subscription module associated with a second subscription; and
   a processing circuit coupled to the communications interface and the plurality of subscription modules, the processing circuit adapted to:
   perform an acquisition process for the first subscription via the communications interface when operating in one of an acquisition (ACQ) state or synchronization (SYNC) state;
   determine a paging schedule for the second subscription, the paging schedule identifying predetermined paging time intervals for monitoring for a mobile-terminated page on the second subscription; and
   during one of the predetermined paging time intervals:
   suspend the acquisition process for the first subscription;
   tune the communications interface to the second subscription; and
   monitor for the mobile-terminated page on the second subscription;
   wherein, when operating in the SYNC state, the processing circuit adapted to suspend the acquisition process for the first subscription comprises the processing circuit further adapted to:
   suspend a synchronization timeout (SYNC TIMOUT) timer defining a time period for decoding a sync message on the first subscription; and
   upon completion of the mobile-terminated page on the second subscription, reinstate the SYNC TIMOUT timer to provide additional time to decode the sync message before declaring a SYNC failure.

2. The access terminal of claim 1, wherein the processing circuit is further adapted to resume the acquisition process for the first subscription after receiving and processing the mobile-terminated page for the second subscription.

3. The access terminal of claim 1, wherein the processing circuit is further adapted to initiate a SYNC SUSPEND timer when the synchronization timeout timer is suspended.

4. The access terminal of claim 1, wherein:
   the first subscription module associated with the first subscription is employed for data communications; and
   the second subscription module associated with the second subscription is employed for voice communications.

5. The access terminal of claim 1, wherein:
   the first subscription module associated with the first subscription is adapted for data communications on a 1xEV-DO radio access network; and
   the second subscription module associated with the second subscription is adapted for voice communications on one of a cdma2000 1x radio access network, a GSM radio access network, a W-CDMA radio access network, and a LTE radio access network.

6. A method operational on an access terminal, comprising:
   performing an acquisition process for a first subscription when operating in one of an acquisition (ACQ) state or synchronization (SYNC) state;
   determining a paging schedule for a second subscription, the paging schedule identifying predetermined paging time intervals for monitoring for a mobile-terminated page on the second subscription;
   during one of the predetermined paging time intervals:
   suspending the acquisition process for the first subscription;
   tuning to the second subscription; and
   monitoring for the mobile-terminated page associated with the second subscription;

wherein, when operating in the SYNC state, the suspending the acquisition process for the first subscription further comprises:
  suspending a synchronization timeout (SYNC TIMOUT) timer defining a time period for decoding a sync message on the first subscription; and
  upon completion of the mobile-terminated page on the second subscription, reinstating the SYNC TIMOUT timer to provide additional time to decode the sync message before declaring a SYNC failure.

7. The method of claim 6, further comprising:
resuming the acquisition process for the first subscription after receiving and processing the mobile-terminated page associated with the second subscription.

8. The method of claim 6, wherein suspending the synchronization timeout (SYNC TIMOUT) timer comprises initiating a SYNC SUSPEND timer.

9. The access terminal of claim 6, wherein performing the acquisition process for the first subscription comprises performing the acquisition process with a 1xEV-DO radio access network; and
  the second subscription module associated with the second subscription is employed for voice communications on one of a cdma2000 1x radio access network, a GSM radio access network, a W-CDMA radio access network, and a LTE radio access network.

10. The access terminal of claim 6, wherein tuning to the second subscription comprises tuning to one of a cdma2000 1x radio access network, a GSM radio access network, a W-CDMA radio access network, and a LTE radio access network.

11. An access terminal, comprising:
  means for performing an acquisition process for a first subscription when operating in one of an acquisition (ACQ) state or synchronization (SYNC) state;
  means for determining a paging schedule for the second subscription, the paging schedule identifying predetermined paging time intervals for monitoring for a mobile-terminated page on the second subscription;
  during one of the predetermined paging time intervals:
    means for suspending the acquisition process for the first subscription;
    means for tuning to the second subscription; and
    means for monitoring for the mobile-terminated page associated with the second subscription;
  wherein, when operating in the SYNC state, the means for suspending the acquisition process for the first subscription further comprises:
    means for suspending a synchronization timeout (SYNC TIMOUT) timer defining a time period for decoding a sync message on the first subscription; and
    upon completion of the mobile-terminated page on the second subscription, means for reinstating the SYNC TIMOUT timer to provide additional time to decode the sync message before declaring a SYNC failure.

12. The access terminal of claim 11, further comprising:
means for resuming the acquisition process for the first subscription after receiving and processing the mobile-terminated page associated with the second subscription.

13. The access terminal of claim 11, wherein the means for suspending the synchronization timeout (SYNC TIMOUT) timer comprises initiating a SYNC SUSPEND timer.

14. The access terminal of claim 11, wherein:
the first subscription is employed for data communications; and
the second subscription is employed for voice communications.

15. The access terminal of claim 11, wherein:
the first subscription is adapted for data communications on a 1xEV-DO radio access network; and
the second subscription is adapted for voice communications on one of a cdma2000 1x radio access network, a GSM radio access network, a W-CDMA radio access network, and a LTE radio access network.

16. A non-transitory processor-readable storage medium, comprising programming for causing a processing circuit to:
  perform an acquisition process for a first subscription when operating in one of an acquisition (ACQ) state or synchronization (SYNC) state;
  determine a paging schedule for the second subscription, the paging schedule identifying predetermined paging time intervals for monitoring for a mobile-terminated page on the second subscription;
  during one of the predetermined paging time intervals:
    suspend the acquisition process for the first subscription;
    release communication interface resources to the second subscription; and
    monitor for the mobile-terminated page associated with the second subscription;
  wherein, when operating in the SYNC state, the programming for causing the processing circuit to suspend the acquisition process for the first subscription further comprises programming for causing the processing circuit to:
    suspend a synchronization timeout (SYNC TIMOUT) timer defining a time period for decoding a sync message on the first subscription; and
    upon completion of the mobile-terminated page on the second subscription, reinstate the SYNC TIMOUT timer to provide additional time to decode the sync message before declaring a SYNC failure.

17. The processor-readable storage medium of claim 16, further comprising programming for causing the processing circuit to:
resume the acquisition process for the first subscription after receiving and processing the mobile-terminated page associated with the second subscription.

18. The processor-readable storage medium of claim 16, wherein the programming for causing the processing circuit to suspend the synchronization timeout (SYNC TIMOUT) timer comprises programming for causing the processing circuit to initiate a SYNC SUSPEND timer.

19. The processor-readable storage medium of claim 16, wherein:
the first subscription is employed for data communications; and
the second subscription is employed for voice communications.

20. The processor-readable storage medium of claim 16, wherein:
the first subscription is adapted for data communications on a 1xEV-DO radio access network; and
the second subscription is adapted for voice communications on one of a cdma2000 1x radio access network, a GSM radio access network, a W-CDMA radio access network, and a LTE radio access network.

* * * * *